United States Patent [19]

Bernardi

[11] 3,716,959
[45] Feb. 20, 1973

[54] BEAM END CONSTRUCTION FOR SEMI-RIGID CONNECTION TO A COLUMN

[76] Inventor: James T. Bernardi, 17200 Fairfield, Detroit, Mich. 48221

[22] Filed: Sept. 15, 1970

[21] Appl. No.: 72,431

[52] U.S. Cl. ............... 52/721, 52/729, 287/189.36 B
[51] Int. Cl. .............................. E04c 3/32, E04c 3/38
[58] Field of Search........ 52/721, 729, 731, 732, 730, 52/726, 664, 666, 668, 167, 229, 634, 637; 287/189.36 R, 189.36 A, 189.36 B, 54, 20

[56] References Cited

UNITED STATES PATENTS

| | | | |
|---|---|---|---|
| 2,382,584 | 8/1945 | Scheyer | 287/189.36 B |
| 2,641,829 | 6/1953 | Sasso | 287/189.36 B |
| 2,123,931 | 7/1938 | Bunker | 52/666 |
| 2,138,291 | 11/1938 | Callaghan | 52/634 |
| 2,146,333 | 2/1939 | Deming | 287/189.36 |
| 2,576,840 | 11/1951 | Kessler | 52/664 |
| 2,720,291 | 10/1955 | Larkin | 287/189.36 R |
| 3,295,288 | 1/1967 | Bakke | 52/721 |

OTHER PUBLICATIONS

Engineering News Record, May 14, 1959, p. 6, Sci. Lib. Call No. TA 1, E61, Vol. 162.

*Primary Examiner*—John E. Murtagh
*Assistant Examiner*—James L. Ridgill, Jr.
*Attorney*—Whittemore, Hulbert & Belknap

[57] ABSTRACT

An H-shaped beam is provided with an end construction for semi-rigid connection to a vertical column. The end construction includes a slot provided in the web adjacent the upper flange of the beam. The slot defines a separated flange portion which is capable of elongation under beam loading. The end of the beam, including the separated flange, is rigidly connected to the column.

2 Claims, 4 Drawing Figures

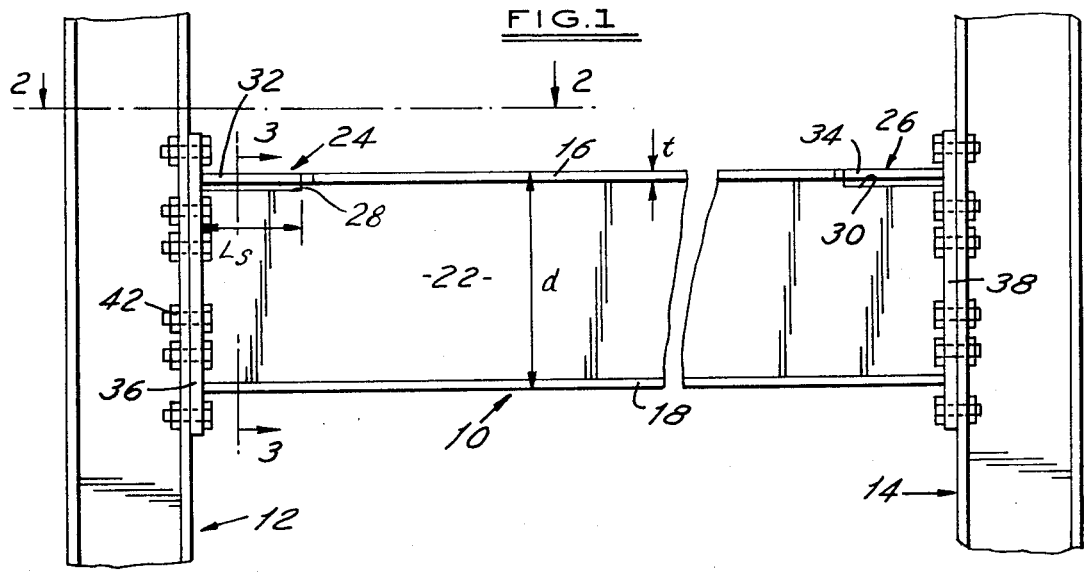
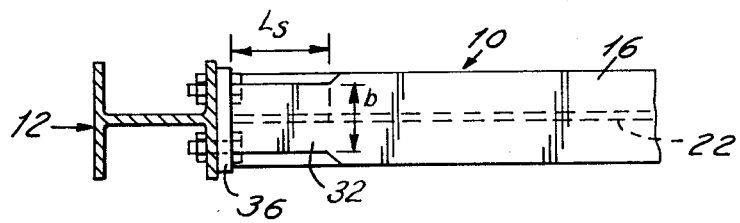
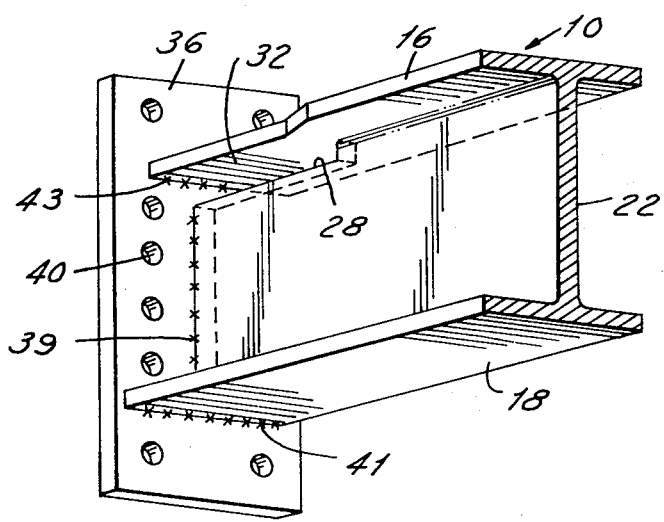
INVENTOR
JAMES T. BERNARDI
BY Whittemore, Hulbert
& Belknap
ATTORNEYS

BEAM END CONSTRUCTION FOR SEMI-RIGID CONNECTION TO A COLUMN

BACKGROUND OF THE INVENTION

One type of connection which has received relatively widespread acceptance in the building construction field for erecting a multi-story steel building frame has been what is termed "semi-rigid." Semi-rigid connections which are located between beams and columns are capable of developing demand moments under load conditions. This permits flexing of the beam which flexing is minimal when a completely rigid connection is made.

In the past, welded semi-rigid connection of H-shaped beams to vertical columns have been accomplished by providing a separate plate on the upper and lower flanges at the end of the beam. The lower plate has been rigidly welded to the beam while the upper plate has had a portion thereof which is not rigidly fastened to the beam flange and is capable of elongation. A portion of each of the plates has extended beyond the end of the beam for making a welded connection to the vertical column.

The disadvantages of this construction have resided in the necessity for welding the beam to the column in the field. Such welding is expensive and time-consuming. In accordance with the present invention, an equivalent result is obtained by providing a slot in the web of the beam adjacent the upper flange. A support plate may then be welded to the end of the beam in the fabricating shop and the beam may be secured to the vertical column in the field by means of bolts. As a consequence, welding in the field may be eliminated thus resulting in lower cost.

SUMMARY OF THE INVENTION

An end construction for an H-shaped beam for semi-rigid connection to a column is provided. The beam comprises an upper flange and a lower flange interconnected by a web. The web has a slot in at least one end adjacent the upper flange to thereby define a separated flange portion at the end of the beam which is capable of elongation upon loading of the beam. A support plate may be welded to the end of the beam for bolting to a vertical column. The separated flange portion, as well as other portions of the beam end, are welded to the plate to thereby provide a rigid connection with only the separated flange portion being capable of elongation under load.

IN THE DRAWING

FIG. 1 is a side elevational view of a beam and column assembly in accordance with one embodiment of the present invention;

FIG. 2 is a sectional view taken substantially along the line 2—2 of FIG. 1 looking in the direction of the arrows;

FIG. 3 is a sectional view taken substantially along the line 3—3 of FIG. 1 looking in the direction of the arrows; and FIG. 4 is a view in perspective of one end of a beam fabricated for assembly on a column.

The beam 10 of the present invention is fabricated for interconnection between adjacent columns 12, 14 forming part of a frame complex, generally a multi-story frame of a building. The columns 12, 14 are vertically oriented while the beams 10 are horizontally oriented as is standard.

The beams 10 are generally H-shaped and include parallel horizontally oriented flanges 16, 18 interconnected at substantially the midpoint thereof by a longitudinally extending vertically oriented web 22 which is normal to the plane of the flanges.

The invention is particularly applicable to beams of the type referred to as wide flange beams utilized for heavy duty frame construction purposes. It will, of course, be appreciated that generally H-shaped beams of other designs, such as junior beams and light weight beams may be modified in accordance with the invention for structural purposes where such beams are utilized. Additionally, the invention may be utilized in connection with both regular series beams and special series beams, the difference in these designations relating only to the degree of demand for particular structural shapes. The only basic limitation on the beams is that they have a generally H-shape in cross-section. The H-shape may be interpreted to include what are referred to as I-beams which also include a pair of narrower spaced apart parallel flanges interconnected by a central web which is normal to the plane of the flanges.

The beam 10 is adapted at each end 24, 26 for a semi-rigid connection to the columns 12, 14. A semi-rigid connection of the type used in the present invention involves a rigid connection of a portion of the beam ends to the columns while still providing a flexible plate portion adjacent the column to permit elongation under load which is necessary to obtain the desired semi-rigid action. This permits the beam to flex under loading as is desired.

The semi-rigid connection is accomplished by providing a slot 28, 30 in each end of the beam 10 in the web 22 directly adjacent to the upper flange end portions 32, 34. The end or separated flange portions 32, 34 of the flange 16 are thus separated from connection with the web 22 and are free to elongate under load. The separated flange portions 32, 34 are also trimmed by removing marginal edge portions. This provides a plate-like member of the desired size to permit the desired degree of elongation.

A plate 36, 38 is welded to each end of the beam 10. As will be noted in FIG. 4, welds 39 are provided between the abutting ends of the web 22, at 41 in the lower flange 18 and at 43 in the separated flange portion 32. Thus, the beam is rigidly connected to the plate. The welds 39, 41 and 43 are designed as required to withstand the shear forces encountered under load. A plurality of bolt openings 40 are provided in each plate 36, 38 for passage of bolts 42 for securement to the flange of each column 12, 14. It should be appreciated that the columns 12, 14 also have an H-shaped cross-section as illustrated in FIG. 2.

The specific length of the slot in the web 22 and the width of the separated flange portion depends upon the physical size of the beam 10, the end moment to be encountered at the connection point and the allowable tension stress in the separated flange portion. Empirical formulations have been developed for this purpose as, for example, set forth on pages 4–48 of the Manual of Steel Construction, Sixth Edition, by American Institute of Steel Construction, Inc., 1965. The following formulation is applicable:

$$T = M/d$$

Where:
  $T$ is the horizontal force top and bottom of the beam 10 in kips (thousands of pounds),
  $M$ is the connection moment in foot - kips,
  $d$ is the depth of the beam 10 in feet;

$$A_p = T/F_t$$

Where:
  $A_p$ is the area of the end or separated flange portion 32 of the upper beam flange 16 in square inches,
  $F_t$ is the allowable tension stress in separated flange, portion 32 in ksi (thousands of pounds per square inch);

$$b = A_p/t$$

Where:
  $b$ is the width of the separated flange portion 32 in inches,
  $t$ is the thickness of the separated flange portion 32 in inches; and $$L_s = 1.5b$$

Where:
  $L_s$ is the length of the slot 28 and of the separated flange portion 32 in inches;

Applying this formula to a specific problem, for example, in the design of a semi-rigid connection for an 18 WF.50 (a regular series wide flange beam having a beam depth of 18 inches or 1.5 feet and a weight per foot of 50 pounds), the flange width, $W$, would be 7.073 inches and the flange thickness, $t$, would be 0.628 inch. Assuming an end moment of 100 ft. - kips and an $F_t$ of 22 ksi, application of the formula would be as follows:

$$T = m/d 100/1.5 = B 66.7 \text{ kips}$$

$$A_{pp} = T/F_t = 66.7/22 = 3.03 \text{ square inches}$$

$$b = A_p/t = 3.03/0.628 = 4.83 \text{ inches}$$

$$L_s = 1.5b = 1.5 \times 4.83 \text{ inches} = 7.245 \text{ inches}$$

thus the length of the separated flange portion would be substantially 7¼ inches and the flange width would be trimmed to substantially 4⅞⅞ inches for this distance.

Illustratively, the beam 10 has been bolted to the columns 12, 14. Alternately, the beam may be welded to the columns although this is considered undesirable because of the cost factor involved. One of the principal advantages of the present invention resides in eliminating the need for field welding to establish the semi-rigid connection and therefore, under normal circumstances, it would not be desired to weld the beam to the column.

What I claim as my invention is:

1. A semi-rigid building frame structure comprising a vertical column of H-shaped cross-section having parallel, vertical first and second flanges interconnected by a web arranged perpendicular thereto, a horizontal beam of H-shaped cross-section extending at right angles from said column and having parallel, horizontal top and bottom flanges interconnected by a web arranged perpendicular thereto, said web of said beam having an elongated recess along its upper edge extending from one end thereof, said recess and said top flange defining an elongated slot separating said top flange from said web of said beam and thereby providing a separated top flange portion, said separated top flange portion being capable of elongation upon loading of said beam, an elongated, flat, vertical support plate having one side abutting said one end of said beam in surface-to-surface relation, the ends of said flanges and web of said beam being welded to said support plate, the opposite side of said support plate abutting the outer side of said first flange of said column in surface-to-surface relation, vertical rows of aligned openings in said support plate and said first flange, and bolts extending through said aligned openings to secure said column and beam together.

2. A semi-rigid building frame structure as defined in claim 1, further characterized in that the length of said slot and the width of the separated flange portion is predetermined by the following formulation:

$$T = M/d$$

Where:
  $T$ is the horizontal force top and bottom of the beam in kips (thousands of pounds),
  $M$ is the connection moment in foot-kips,
  $d$ is the depth of the beam in feet;

$$A_p = T/F_t$$

Where:
  $A_p$ is the area of the separated flange portion of the upper beam flange,
  $f_{tt}$ is the allowable tension stress in separated flange portion in ksi (thousands of pounds per square inch);

$$b = A_p/t$$

Where:
  $b$ is the width of the separated flange portion,
  $t$ is the thickness of the separated flange portion; and $$L_2 = 1.5b$$

Where:
  $L_s$ is the length of the slot and of the separated flange portion.

* * * * *